Figures 1, 2, 3:
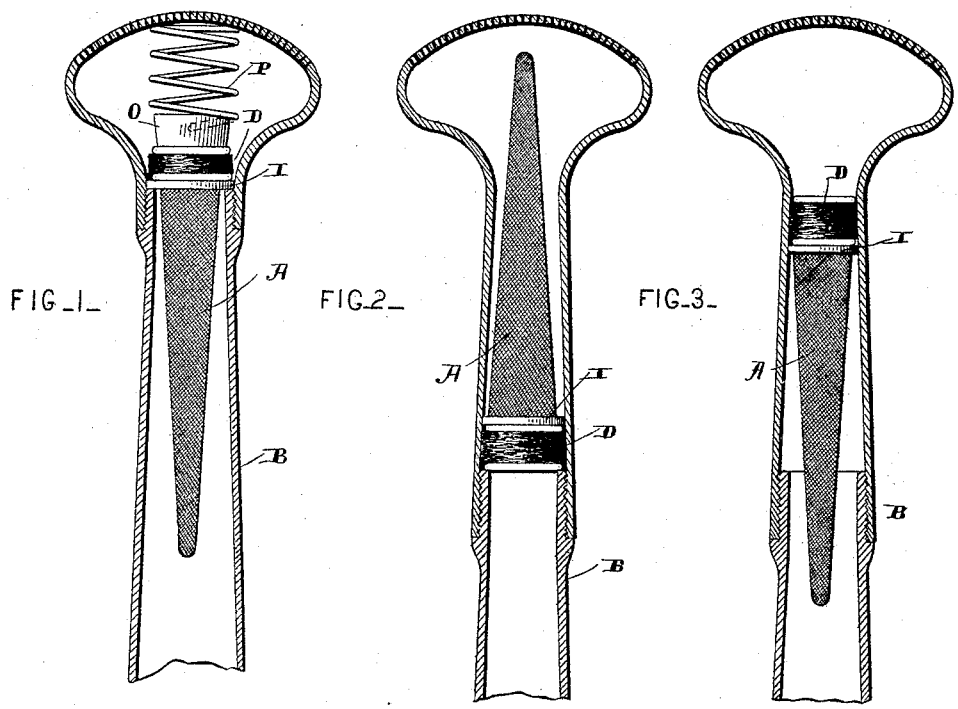

(No Model.)

F. SPLITTSTOSER.
SPRINKLER.

No. 460,368. Patented Sept. 29, 1891.

WITNESSES
Geo. E. Frech.
Roland A. Fitzgerald

INVENTOR
F. Splittstoser
per
Lehmann & Pattison,
Attys.

United States Patent Office.

FERDINAND SPLITTSTOSER, OF NORTH BRANCH, MINNESOTA.

SPRINKLER.

SPECIFICATION forming part of Letters Patent No. 460,368, dated September 29, 1891.

Application filed April 29, 1891. Serial No. 390,960. (No model.)

*To all whom it may concern:*

Be it known that I, FERDINAND SPLITTSTOSER, of North Branch, in the county of Isanti and State of Minnesota, have invented certain new and useful Improvements in Sprinklers; and I do hereby declare the following to be a full, clear, and exact description of the invention, such as will enable others skilled in the art to which it pertains to make and use it, reference being had to the accompanying drawings, which form part of this specification.

My invention relates to an improvement in sprinklers; and it consists in the construction and arrangement of parts, which will be fully described hereinafter, and pointed out in the claims.

The object of my invention is to provide a sprinkler with a removable strainer, so as to prevent the sprinkler from becoming clogged with the dirt in the water, and which strainer can be removed at any time for the purpose of being cleaned.

The accompanying drawings, of which there are three figures, represent vertical sections of sprinklers, showing my strainer applied thereto in different ways.

A represents a strainer, which is preferably made of wire-gauze or other suitable material, and which is here shown in the form of a conical tube of suitable length, and which is to be placed inside of the pipe B of the sprinkler, as shown. All of the water that passes through the pipe and the sprinkler is made to pass through this strainer, and applied to the end of the strainer is a suitable packing D, of any suitable material, and a washer I for the purpose of forming a tight joint with the tube or pipe, and thus preventing any leakage of water past this larger end. This strainer may be placed inside the tube or pipe with either its large or its small end toward the sprinkler, according to the relative sizes of the strainer and tube or pipe. Whether the large or small end of the strainer is inserted first, the packing forms a tight joint with the inner side of the tube or pipe, and the pressure of the water against the strainer serves to make the joint more secure.

Where the sprinkler screws on and off the end of the pipe, the small end of the strainer is inserted first, and then the washer and packing forms a tight joint with the smallest portion of the pipe or tube in which it is placed. In order to prevent the pressure of the water from forcing the strainer out of position, a small separate tube O, having a spiral spring P secured to it, is placed between the inner side of the sprinkler and the large end of the strainer. The end of the tube enters the large end of the strainer and then the pressure of the spring serves to hold the strainer tightly in position. All of the coarser dirt and particles in the water are caught by the strainer and prevented from clogging up the sprinkler, as they otherwise would do. Whenever the strainer becomes clogged, it is only necessary to remove it from the pipe or tube and shake out the material that is clogging it up and then return it to position. This strainer is very cheap and simple, and can be applied to sprinklers of all kinds with great benefit, and will save the person using it much time and trouble where the water is not always clean.

Having thus described my invention, I claim—

1. In a sprinkler, a pipe, a detachable sprinkler secured thereto, the connecting portion of which is made tapering, a conical strainer adapted to fit said sprinkler and having an extended tapering portion, and the packing secured to said tapering portion, whereby the latter is made to tightly fit the tapering pipe of the sprinkler, the parts being combined to operate substantially as shown and described.

2. In a sprinkler, a pipe, a sprinkler-head adapted to fit the end of the pipe, a removable tapering strainer having a shoulder which rests on the end of the said pipe, a removable tapering pipe-section O, adapted to fit the open end of the strainer, and a spring secured at one end to the pipe O and its outer free end adapted to bear against the inner side of the sprinkler-head, whereby the strainer is held in position in the pipe, the parts being combined to operate substantially as shown and described.

In testimony whereof I affix my signature in presence of two witnesses.

FERDINAND SPLITTSTOSER.

Witnesses:
H. F. BARKER,
GEORGE C. STARR.